United States Patent
Kang et al.

(10) Patent No.: US 9,412,993 B2
(45) Date of Patent: Aug. 9, 2016

(54) BATTERY MODULE EQUIPPED WITH SENSING MODULES HAVING IMPROVED COUPLING STRUCTURE

(71) Applicant: LG CHEM, LTD., Seoul (KR)

(72) Inventors: Dal-Mo Kang, Daejeon (KR); Jong-Woon Choi, Daejeon (KR); Jeong-O Mun, Daejeon (KR); Jun-Yeob Seong, Daejeon (KR); Young-Sop Eom, Daejeon (KR); Ki-Youn Kim, Daejeon (KR); Sun-Mo An, Daejeon (KR); Gang-U Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/606,634

(22) Filed: Jan. 27, 2015

(65) Prior Publication Data

US 2015/0140380 A1 May 21, 2015

Related U.S. Application Data

(63) Continuation of application No. PCT/KR2014/007841, filed on Aug. 22, 2014.

(30) Foreign Application Priority Data

Oct. 29, 2013 (KR) ...................... 1 0-201 3-01 29589

(51) Int. Cl.
*H01M 2/30* (2006.01)
*H01M 2/10* (2006.01)
(Continued)

(52) U.S. Cl.
CPC .............. *H01M 2/30* (2013.01); *H01M 2/1061* (2013.01); *H01M 2/1077* (2013.01);
(Continued)

(58) Field of Classification Search
CPC ................................ H01M 2/20; H01M 10/48
USPC .................................................. 429/158–161
See application file for complete search history.

(56) References Cited

U.S. PATENT DOCUMENTS

2003/0129457 A1* 7/2003 Kawai et al. ...................... 429/7
2006/0162149 A1 7/2006 Ha et al.
(Continued)

FOREIGN PATENT DOCUMENTS

JP 2009-105058 A 5/2009
KR 10-0880389 A 1/2009
(Continued)

OTHER PUBLICATIONS

International Search Report, issued in PCT/KR2014/007841, mailed Dec. 23, 2014.
(Continued)

*Primary Examiner* — James Lee
(74) *Attorney, Agent, or Firm* — Birch, Stewart, Kolasch & Birch, LLP (57) ABSTRACT

A battery module according to an exemplary embodiment of the present disclosure includes a plurality of cell cartridges including at least one battery cell having an electrode terminal and a molding case to receive the battery cell, the molding case having a plurality of coupling protrusions protruding outward, and a sensing module connected to the coupling protrusions to couple the plurality of cell cartridges, the sensing module having a voltage sensing terminal coming into contact with the electrode terminal by the coupling.

According to one aspect of the present disclosure, a cost and time taken to manufacture the battery module may reduce by simplifying a connection structure of the plurality of battery cells, and simplifying a coupling structure between the battery cell and the sensing module installed to sense the voltage of the battery cell.

8 Claims, 7 Drawing Sheets

(51) Int. Cl.
*H01M 2/20* (2006.01)
*H01M 10/42* (2006.01)
*H01M 10/48* (2006.01)

(52) U.S. Cl.
CPC ............. *H01M 2/202* (2013.01); *H01M 2/204* (2013.01); *H01M 10/4257* (2013.01); *H01M 10/48* (2013.01); *H01M 10/482* (2013.01)

(56) References Cited

U.S. PATENT DOCUMENTS

| | | | |
|---|---|---|---|
| 2007/0184341 A1* | 8/2007 | Yoon et al. ................ | 429/152 |
| 2007/0238018 A1* | 10/2007 | Lee ..................... | H01M 2/1077 429/159 |
| 2012/0003505 A1* | 1/2012 | Kim ................... | H01M 2/1077 429/7 |
| 2012/0315522 A1 | 12/2012 | Shin et al. | |
| 2013/0078487 A1* | 3/2013 | Shin ................... | H01M 10/482 429/62 |
| 2013/0196193 A1 | 8/2013 | Okamoto et al. | |

FOREIGN PATENT DOCUMENTS

| | | |
|---|---|---|
| KR | 10-2011-0112896 A | 10/2011 |
| KR | 10-2013-0042430 A | 4/2013 |
| KR | 10-2013-0093145 A | 8/2013 |

OTHER PUBLICATIONS

Written Opinion of the International Searching Authority, issued in PCT/KR2014/007841, mailed Dec. 23, 2014.

* cited by examiner

BATTERY MODULE EQUIPPED WITH SENSING MODULES HAVING IMPROVED COUPLING STRUCTURE

CROSS-REFERENCE TO RELATED APPLICATION

The present application is a continuation of International Application No. PCT/KR2014/007841 filed on Aug. 22, 2014, which claims priority to Korean Patent Application No. 10-2013-0129589 filed in the Republic of Korea on Oct. 29, 2013, the disclosures of which are incorporated herein by reference.

TECHNICAL FIELD

The present disclosure relates to a battery module equipped with sensing modules having an improved coupling structure, and more particularly, to a battery module equipped with sensing modules which are coupled with cartridges in a sliding manner so that a plurality of cartridges are connected to each other, and at the same time, an electrode terminal of a battery cell is connected to a sensing terminal of a sensing module.

BACKGROUND ART

Recently, a secondary battery which is rechargeable is being widely used as an energy source of a wireless mobile device. Also, a secondary battery is gaining attention as a power source of electric vehicles (EVs) and hybrid electric vehicles (HEVs) that are suggested as an alternative of existing gasoline vehicles and diesel vehicles using fossil fuels involving an air pollution issue.

For a small mobile device, one or more (two or three) battery cells are used, and for a medium and large device such as a vehicle, a medium and large battery module implemented by electrically connecting a plurality of battery cells is used due to the need for high output and large capacity, and a battery pack implemented by connecting a plurality of battery modules may be also used.

As it is preferred to make a medium and large battery module as small and light as possible, a prismatic battery and a pouch-type battery that are stackable with high integration and have a low weight to capacity are mainly used as a battery cell applied in a medium and large battery module.

Particularly, a pouch-type battery cell using an aluminum laminate sheet as an exterior member is gaining much attention these days due to its advantages of light weight, a low manufacturing cost, and easy shape modification.

Also, for a medium and large battery module to provide an output and a capacity required for a certain apparatus or device, it is necessary to electrically connect a plurality of battery cells either in series or in parallel, or both and maintain a stable structure against an external force.

Figure 1:
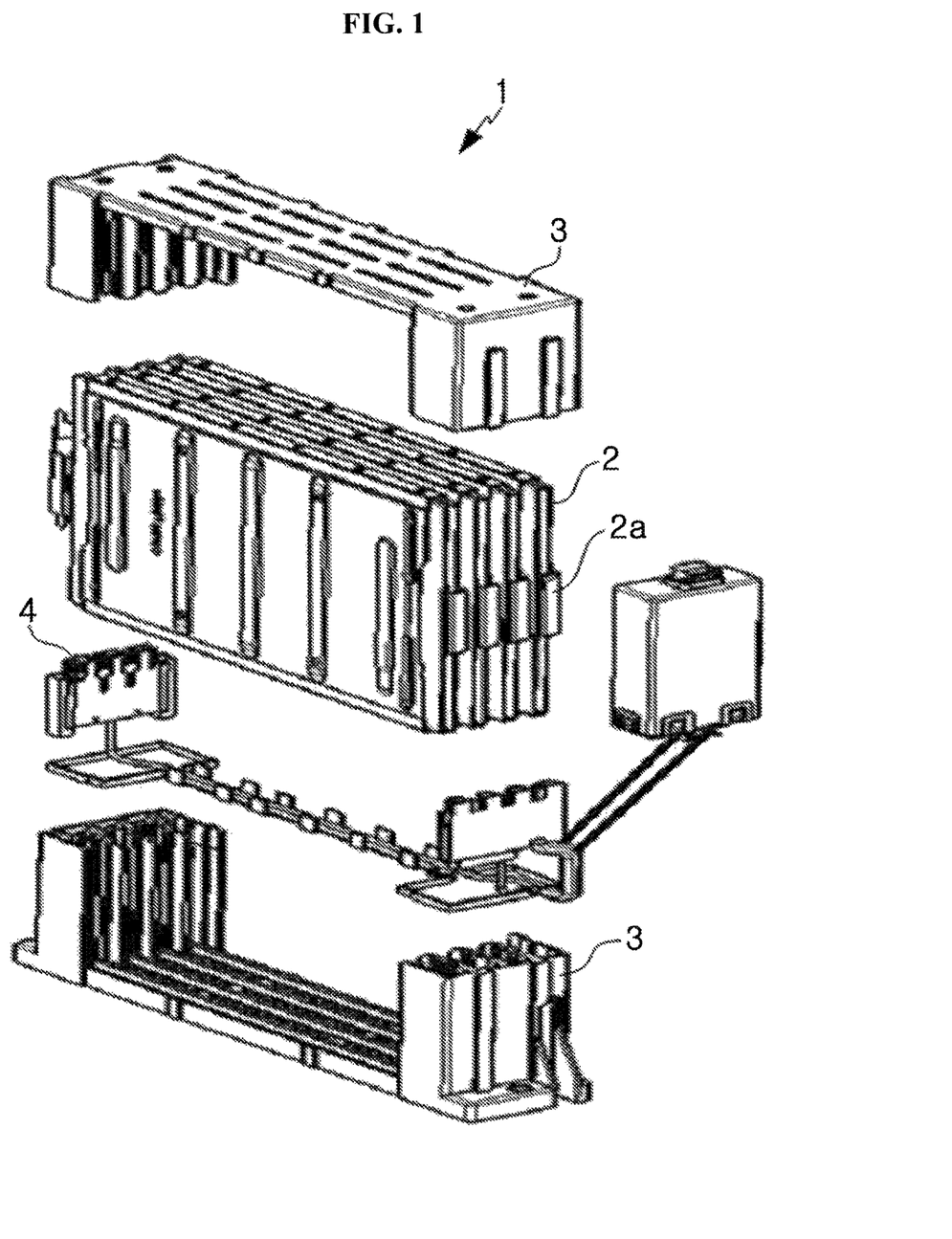
FIG. 1 is a diagram illustrating a battery module according to a related art.

Referring to FIG. 1, in the case of a traditional battery module 1, structural stability is achieved by fixing and receiving a plurality of battery cells 2 using a module case 3 having a support structure for fixing the battery cells 2, and aside from this, connecting an electrode terminal 2a of the battery cell 2 to a sensing module 4 for sensing the voltage of each battery cell.

For the traditional battery module 1 to ensure dynamic stability, a module case having a complicated structure for fixing a battery cell stack structure is needed, and a separate process of electrically connecting the sensing module 4 to the battery cell 2 in a clip or welding manner is added, and thus, there are disadvantages of a complex process and an increased manufacturing cost.

That is, in the case of a wire type, assembly performance is excellent but a product cost increases due to addition of a wire component cost, and in the case of a welding type, a welding cost and efforts involved in welding is added and resistance against impact such as vibration is poor.

Therefore, to solve the problems, there is a need for a battery module having a structure that may be assembled through a simple process.

DISCLOSURE

Technical Problem

The present disclosure is designed to solve the above problem, and therefore, the present disclosure is directed to providing a battery module having a structure that simultaneously achieves the connection of a plurality of battery cells and the connection of a battery cell and a sensing module through a simple process.

However, the object of the present disclosure is not limited to the above object, and other objects of the present disclosure will become apparent to those skilled in the art from the following description.

Technical Solution

To achieve the above object, a battery module according to an exemplary embodiment of the present disclosure includes a plurality of cell cartridges including at least one battery cell having an electrode terminal and a molding case to receive the battery cell, the molding case having a plurality of coupling protrusions protruding outward, and a sensing module connected to the coupling protrusions to couple the plurality of cell cartridges, the sensing module having a voltage sensing terminal coming into contact with the electrode terminal by the coupling.

The sensing module may include a plurality of first guide ribs having a shape corresponding to the coupling protrusions, and the sensing module may be coupled to the cell cartridges in a sliding manner.

The voltage sensing terminal may press the electrode terminal in an elastically deformable manner by the coupling.

The sensing module may include a circuit board connected to the voltage sensing terminal.

The sensing module may include a connector terminal to which an external device is connected, the external device connected to the circuit board to measure a voltage of the battery cell.

The battery module may include a sensing module cover connected to the coupling protrusions and coupled to the sensing module.

The sensing module cover may include a second guide rib having a shape corresponding to the coupling protrusions, and the sensing module cover may be coupled to the cell cartridges in a sliding manner.

The sensing module cover may include a support rib disposed on the opposite side to the voltage sensing terminal across the electrode terminal to support the electrode terminal.

The battery module may include an external terminal electrically connected to the electrode terminal.

The battery module may include a bus bar to connect the electrode terminal to the external terminal.

Advantageous Effects

According to one aspect of the present disclosure, a cost and time taken to manufacture a battery module may reduce by simplifying a connection structure of a plurality of battery cells, and simplifying a coupling structure between a battery cell and a sensing module installed to sense the voltage of the battery cell.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, an entire structure of a battery module 100 according to an exemplary embodiment of the present disclosure is described with reference to FIGS. 2 and 3.

Figure 2:
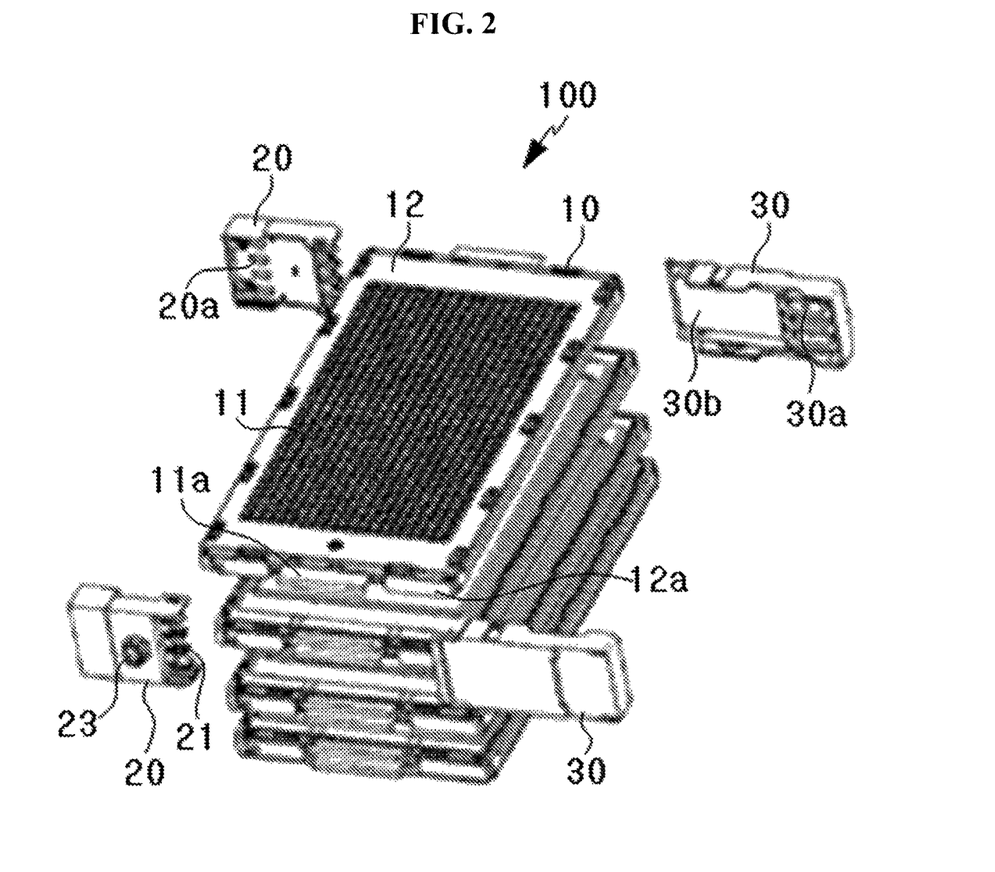
FIG. 2 is an exploded perspective view illustrating a battery module according to an exemplary embodiment of the present disclosure.
Figure 3:
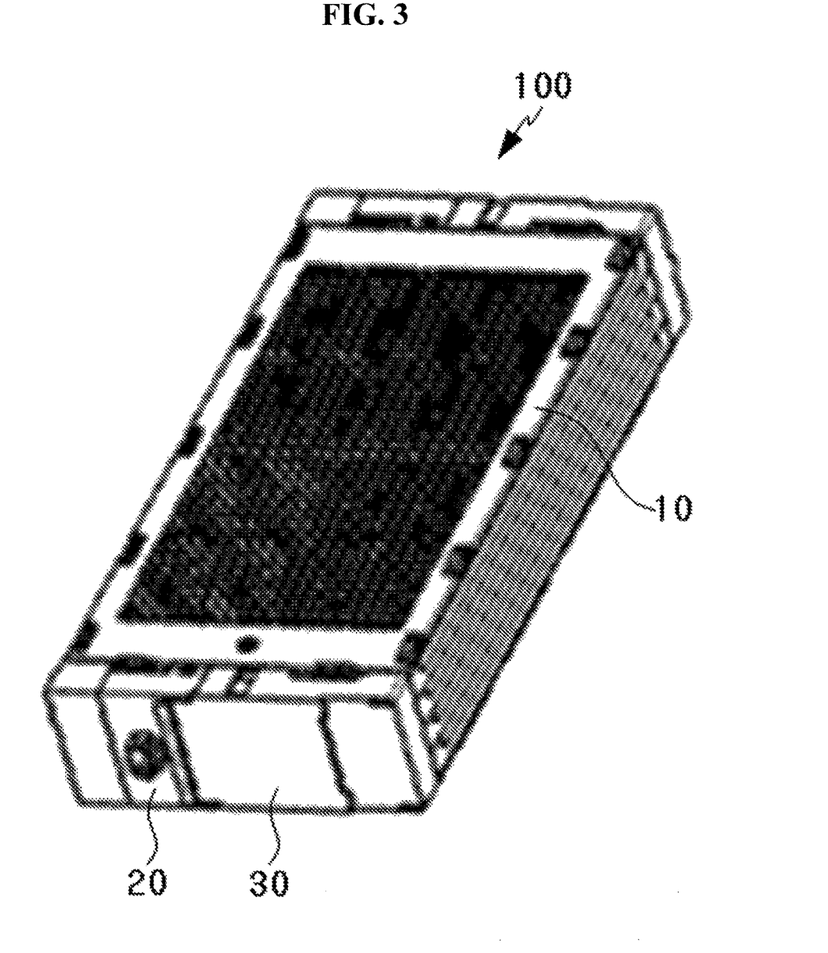
FIG. 3 is an assembled perspective view illustrating the battery module shown in FIG. 2.

FIG. 2 is an exploded perspective view illustrating the battery module according to an exemplary embodiment of the present disclosure, and FIG. 3 is an assembled perspective view illustrating the battery module shown in FIG. 2.

Referring to FIGS. 2 and 3, the battery module 100 according to an exemplary embodiment of the present disclosure includes a plurality of cell cartridges 10 and a pair of sensing modules 20 connected to the cell cartridges 10. Also, the battery module 100 may further include a sensing module cover 30 connected to the cell cartridge 10 and the sensing module 20.

The cell cartridge 10 includes at least one battery cell 11 having a pair of electrode terminals 11a, and a molding case 12 to receive the battery cell 11.

In the case where a plurality of battery cells 11 is received in the molding case 12, the battery cells 11 may be connected either in series or in parallel or both, through connection of the electrode terminals 11a provided in each battery cell 11.

Also, among the plurality of cell cartridges 10, adjacent cell cartridges 10 may be connected either in series or in parallel or both, through connection of the electrode terminals 11a provided in the battery cell 11, thereby increasing a capacity or an output voltage of the battery module 100.

In this instance, a pouch-type battery cell including an electrode assembly and a pouch case to receive the electrode assembly may be used as the battery cell 11.

The molding case 12 receives the at least one battery cell 11 such that the electrode terminals 11a are drawn outside, and has a plurality of coupling protrusions 12a. The coupling protrusion 12a may serve as a holder to couple the sensing module 20 and the sensing module cover 30 to the cell cartridge 10.

Figure 4:
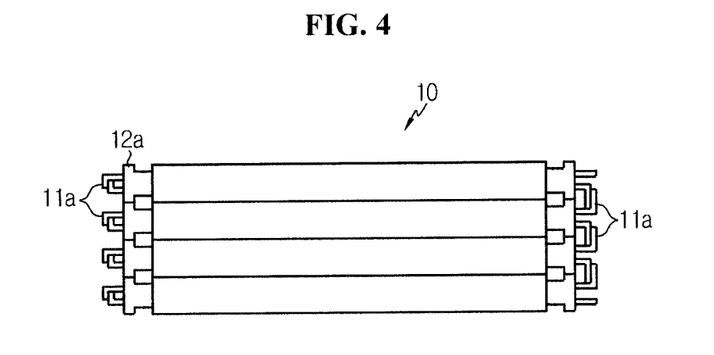
FIG. 4 is a side view illustrating a cell cartridge stack structure applied to the battery module shown in FIG. 2.

The coupling protrusion 12a may be provided at both sides in a direction in which the electrode terminal 11a is drawn, that is, in a lengthwise direction of the molding case 12 (see FIGS. 2 and 4).

The sensing module 20 is coupled to the cell cartridge 10 to connect the plurality of cell cartridges 10 and is connected to the electrode terminal 11a to individually measure the voltage of each battery cell 11, and may include a plurality of first guide ribs 20a, a voltage sensing terminal 21, a circuit board 22 (see FIG. 7), and a connector terminal 23.

The first guide rib 20a is provided on an inner surface of the sensing module 20, and has a shape corresponding to the coupling protrusion 12a to couple the sensing module 20 to the cell cartridge 10 in a sliding manner.

The voltage sensing terminal 21 comes into contact with the electrode terminal 11a when the cell cartridge 10 and the sensing module 20 are coupled, and when the sensing module 20 is coupled to the cell cartridge 10, may press the electrode terminal 11a in an elastically deformable manner and come into contact with the electrode terminal 11a.

The circuit board 22 has an internal circuit designed to independently connect the plurality of electrode terminals 11a to the connector terminal 23, and may be implemented in a form of, for example, a printed circuit board in which the internal circuit pattern is printed.

The connector terminal 23 corresponds to a terminal to which an external device, that is, a device for measuring the voltage of each battery cell 11 is connected.

The sensing module cover 30 is coupled to the cell cartridge 10 and the sensing module 20, and may have a plurality of second guide ribs 30a and a support rib 30b.

The second guide rib 30a is provided on an inner surface of the sensing module cover 30, and has a shape corresponding to the coupling protrusion 12a to couple the sensing module cover 30 to the cell cartridge 10 in a sliding manner.

The support rib 30b is disposed on the opposite side to the voltage sensing terminal 21 across the electrode terminal 11a, and may perform a function of supporting the electrode terminal 11a. That is, the support rib 30b may serve to support the electrode terminal 21 to allow the voltage sensing terminal 21 to press the electrode terminal 11a in an elastically deformable manner.

Although not shown in drawings, the sensing module cover 30 may further have a groove or protrusion for coupling with the sensing module 20.

Subsequently, a connection structure of the electrode terminals 11a provided in each of the plurality of battery cells is described with reference to FIG. 4.

FIG. 4 is a side view illustrating a cell cartridge stack structure applied to the battery module shown in FIG. 2.

Referring to FIG. 4, the cell cartridge stack structure may be implemented by connecting the electrode terminals 11a provided in the plurality of battery cells 11 (see FIG. 2).

That is, as described in the foregoing, the battery cells 11 may be connected either in series or in parallel or both, and by way of illustration, the drawing of the present disclosure shows that the plurality of battery cells 11 are connected in series. However, the present disclosure is not limited to the exemplary connection structure.

Subsequently, an external terminal 40 and a bus bar 50 provided in the battery module 100 are described with reference to FIG. 5.

Figure 5:
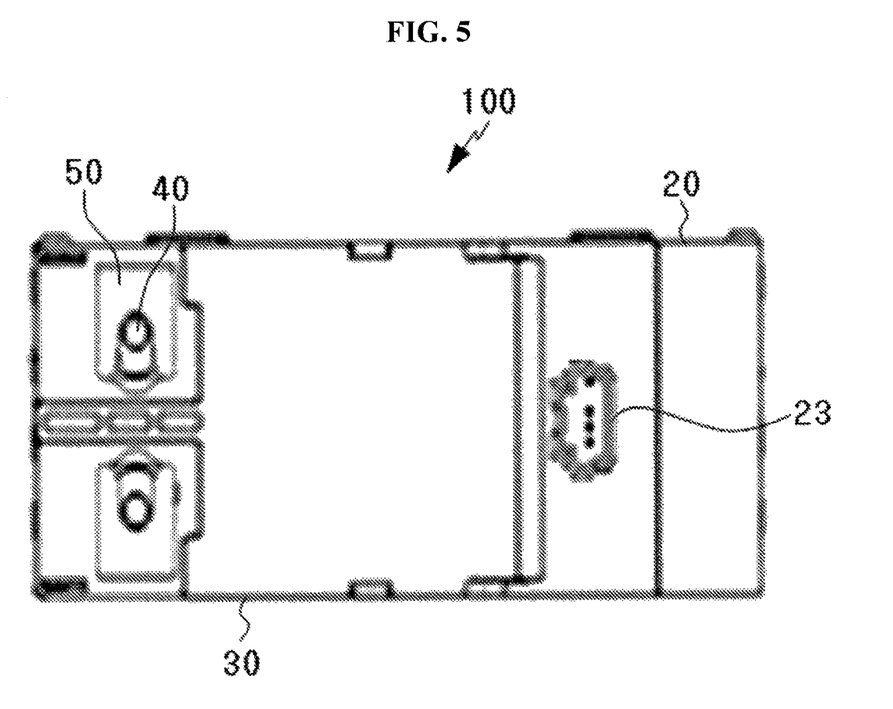
FIG. 5 is a front view illustrating the battery module shown in FIG. 2.

FIG. 5 is a front view illustrating the battery module shown in FIG. 2.

Referring to FIG. 5, the battery module 100 according to an exemplary embodiment of the present disclosure may further include a pair of external terminals 40 and a pair of bus bars 50.

The external terminal 40 serves as an electrical connection channel between the battery cell 11 and an external device operating by electricity received form the battery cell 11, and is electrically connected to the electrode terminal 11a of the battery cell 11 and protrudes out of the battery module 100.

The bus bar 50 connects the electrode terminal 11a provided in the battery cell 11 to the external terminal 40.

As described above, because the battery module 100 includes the external terminal 40 and the bus bar 50, the battery module 100 has a structure that electrically connects the plurality of battery cells 11 to the external device.

Subsequently, a contact structure between the electrode terminal 11a and the voltage sensing terminal 21 is described in detail with reference to FIGS. 6 and 7.

Figure 6:
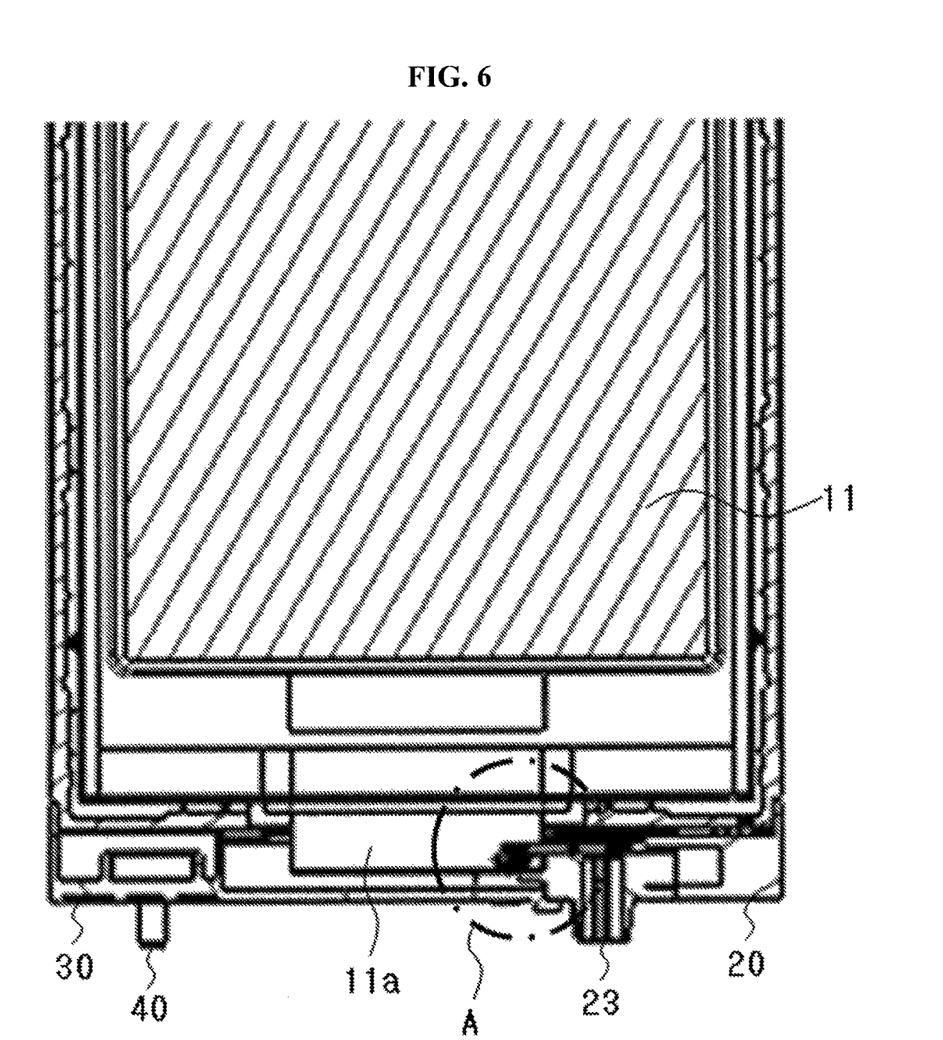
FIG. 6 is a plane view illustrating an internal structure of the battery module shown in FIG. 2.
Figure 7:
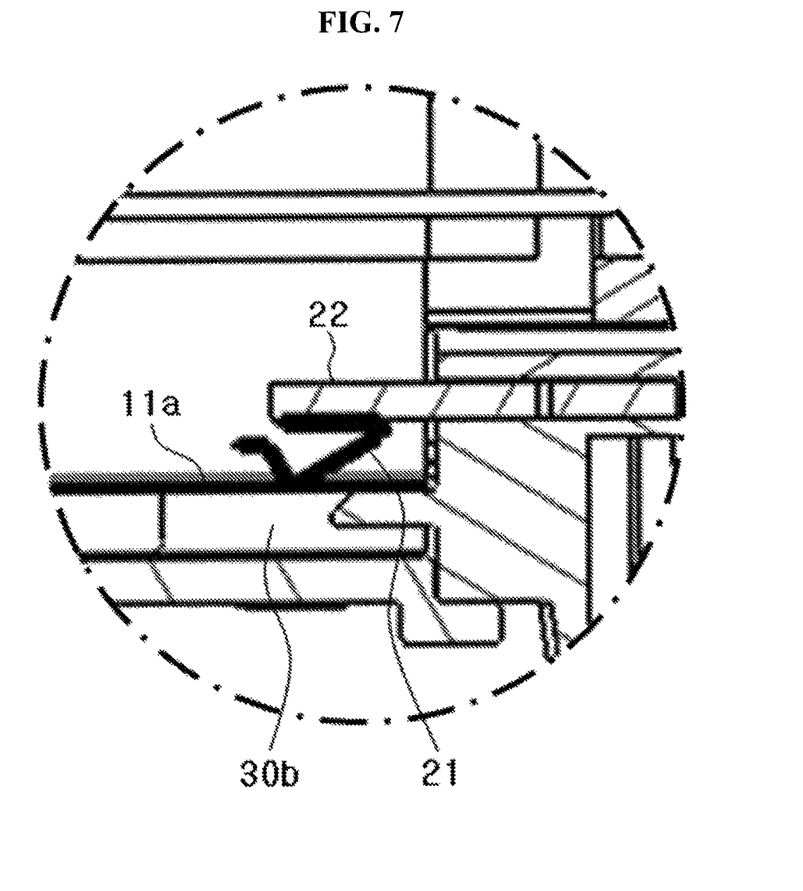
FIG. 7 is a partial enlarged view of Section A of FIG. 6.

FIG. 6 is a plane view illustrating an internal structure of the battery module shown in FIG. 2, and FIG. 7 is a partial enlarged view of Section A of FIG. 6.

Referring to FIGS. 6 and 7, the voltage sensing terminal 20a has at least one curved part, and presses the electrode terminal 11a supported by the support rib 30b in an elastically deformable manner to electrically connect the battery cell 11 to the circuit board 22.

The contact made by the elastic press is made, as previously described, when the sensing module 20 is coupled to the cell cartridge 10.

As described in the foregoing, the battery module 100 according to an exemplary embodiment of the present disclosure has a structure that connects the plurality of cell cartridges 10 at one time by coupling the sensing module 20 to the cell cartridge 10.

Also, the battery module 100 has a structure that enables this coupling simultaneously with coupling of the voltage sensing terminal 21 and the electrode terminal 11a, and a structure that stably maintains the coupling of the sensing terminal 21 and the electrode terminal 11a even in the presence of an external impact.

Accordingly, by employing the structure of the battery module 100 according to an exemplary embodiment of the present disclosure, efficiency in a battery module manufacturing process may improve and a product quality may improve.

Hereinabove, the present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A battery module comprising:
   a plurality of cell cartridges including at least one battery cell having an electrode terminal and a molding case to receive the battery cell, the molding case having a plurality of coupling protrusions protruding outward from the at least one battery cell;
   a sensing module connected to the coupling protrusions to couple the plurality of cell cartridges, the sensing module having a voltage sensing terminal coming into contact with the electrode terminal by the coupling; and
   a sensing module cover connected to the coupling protrusions and coupled to the sensing module,
   wherein the sensing module comprises a plurality of first guide ribs having a shape corresponding to the coupling protrusions so that the sensing module is coupled to the cell cartridges in a sliding manner using the first guide ribs,
   wherein the sensing module cover comprises a second guide rib having a shape corresponding to the coupling protrusions so that the sensing module cover is coupled to the cell cartridges in a sliding manner using the second guide ribs, and
   wherein the sensing module is coupled to a first part of the coupling protrusions, and the sensing module cover is coupled to a second part of the coupling protrusions.

2. The battery module according to claim 1, wherein the voltage sensing terminal presses the electrode terminal in an elastically deformable manner by the coupling.

3. The battery module according to claim 1, wherein the sensing module comprises:
   a circuit board connected to the voltage sensing terminal.

4. The battery module according to claim 3, wherein the sensing module comprises:
   a connector terminal to which an external device is connected, the external device connected to the circuit board to measure a voltage of the battery cell.

5. The battery module according to claim 1, wherein the sensing module cover comprises:
   a support rib disposed on the opposite side to the voltage sensing terminal across the electrode terminal to support the electrode terminal.

6. The battery module according to claim 1, wherein the battery module comprises:
   an external terminal electrically connected to the electrode terminal.

7. The battery module according to claim 6, wherein the battery module comprises:
   a bus bar to connect the electrode terminal to the external terminal.

8. The battery module according to claim 1, wherein the molding case surrounds the at least one battery cell.

* * * * *